(12) United States Patent
Lu

(10) Patent No.: US 8,332,450 B2
(45) Date of Patent: Dec. 11, 2012

(54) METHOD OF CORDIC COMPUTING VECTOR ANGLE AND ELECTRONIC APPARATUS USING THE SAME

(75) Inventor: Ming-Ho Lu, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 930 days.

(21) Appl. No.: 12/412,356

(22) Filed: Mar. 26, 2009

(65) Prior Publication Data

US 2010/0161697 A1    Jun. 24, 2010

(30) Foreign Application Priority Data

Dec. 19, 2008    (TW) ................................ 97149760 A

(51) Int. Cl.
G06F 17/10    (2006.01)
G06F 7/38     (2006.01)
H04L 27/06    (2006.01)

(52) U.S. Cl. ........ 708/300; 708/209; 708/441; 375/302; 375/324; 375/326; 375/327

(58) Field of Classification Search .................. 708/209, 708/300, 441; 375/327, 302, 324, 326
See application file for complete search history.

(56) References Cited

U.S. PATENT DOCUMENTS

| | | | | |
|---|---|---|---|---|
| 6,771,715 B1* | 8/2004 | Rives et al. | ........... | 375/327 |
| 7,394,869 B2* | 7/2008 | Jensen et al. | ........... | 375/302 |
| 7,545,878 B1* | 6/2009 | Hall et al. | ........... | 375/285 |
| 7,630,459 B2* | 12/2009 | Lu | ........... | 375/326 |
| 7,711,762 B2* | 5/2010 | Howard et al. | ........... | 708/490 |
| 7,822,389 B2* | 10/2010 | Muhammad et al. | ........... | 455/78 |
| 7,889,782 B2* | 2/2011 | Gorday et al. | ........... | 375/150 |
| 8,081,714 B2* | 12/2011 | Ibrahim et al. | ........... | 375/324 |
| 8,184,747 B2* | 5/2012 | Baker et al. | ........... | 375/326 |
| 2004/0161055 A1* | 8/2004 | Sinha | ........... | 375/322 |
| 2005/0220218 A1* | 10/2005 | Jensen et al. | ........... | 375/302 |
| 2009/0316838 A1* | 12/2009 | Fuller et al. | ........... | 375/340 |
| 2010/0293210 A1* | 11/2010 | Sima et al. | ........... | 708/209 |

OTHER PUBLICATIONS

"A CORDIC processor with efficient table-lookup schemes for rotations and on-line scale factor compensations," Author(s): Chih, J.-C.; Kun-Lung Chen ; Sau-Gee Chen, pp. 3315-3318 vol. 4, Date: 2005; http://ieeexplore.ieee.org/xpls/abs_all.jsp?arnumber=1465337.*
Authored by Wang, et al., article titled "Critically Damped CORDIC Algorithm," adopted from IEEE, 1995, pp. 253-256.
Authored by Timmermann, et al., article titled "Low Latency Time CORDIC Algorithms", adopted from IEEE Transactions on Computers, vol. 41, No. 8, Aug. 1992, pp. 1010-1015.

* cited by examiner

*Primary Examiner* — Tammara Peyton
(74) *Attorney, Agent, or Firm* — Jianq Chyun IP Office

(57) ABSTRACT

A method of computing a vector angle by using a CORDIC and an electronic apparatus using the same are disclosed. The electronic apparatus mainly includes a phase error detector, a loop filter, a small-area iteration LUT module and a phase compensation circuit. The phase error can be locked by using the error function in the phase error detector, and even the phase error can be locked to the minimum so that the error oscillates up-and-down about the zero level. The first transfer function in the loop filter can determine the baseband and the converging speed. Moreover, if the shifting technique is used, the operation of the first transfer function is speeded up. By using a phase-locking loop in association with looking up the above-mentioned LUT, the method is able to get fast converging and higher accuracy for the computation.

15 Claims, 15 Drawing Sheets

| i | $K=2^{\wedge}(-i)$ | COMPLEX NUMBER $R=1+jk$ | atan(k) | VECTOR LENGTH OF R | CORDIC GAIN VALUE |
|---|---|---|---|---|---|
| 0 | 1.0 | 1+j1.0 | 45.00000 | 1.41421356 | 1.414213562 |
| 1 | 0.5 | 1+j0.5 | 26.56505 | 1.11803399 | 1.581138830 |
| 2 | 0.25 | 1+j0.25 | 14.03624 | 1.03077641 | 1.629800601 |
| 3 | 0.125 | 1+j0.125 | 7.12502 | 1.00778222 | 1.642484066 |
| 4 | 0.0625 | 1+j0.0625 | 3.57633 | 1.00195122 | 1.645688916 |
| 5 | 0.03125 | 1+j0.03125 | 1.78991 | 1.00048816 | 1.646492279 |
| 6 | 0.015625 | 1+j0.015625 | 0.89517 | 1.00012206 | 1.646693254 |
| 7 | 0.007813 | 1+j0.007813 | 0.44761 | 1.00003052 | 1.646743507 |
| ... | ... | ... | ... | ... | ... |

FIG. 3 (PRIOR ART)

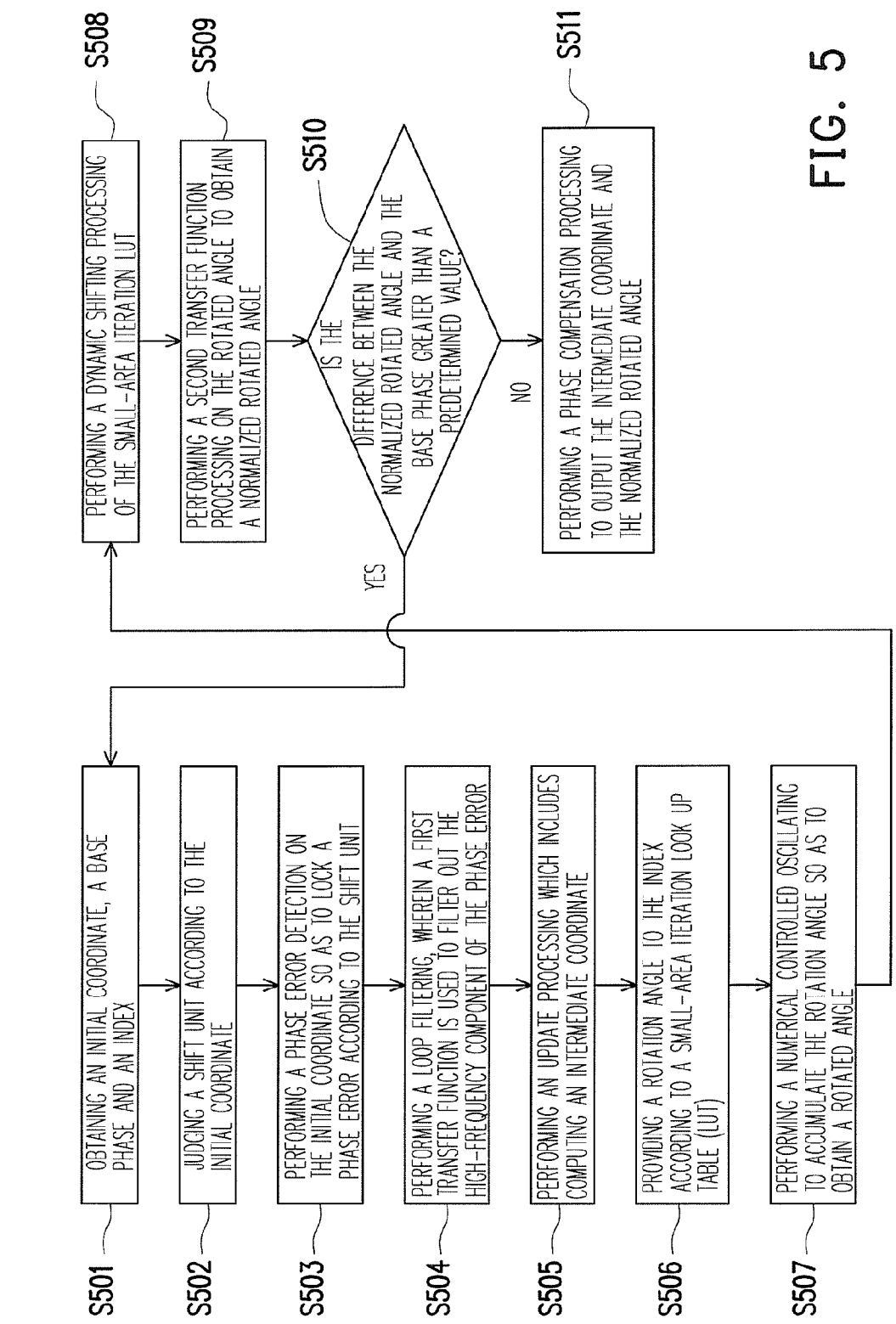

| I | Q | I-Q | $\theta$ |
|---|---|---|---|
| 1 | 0 | 1 | 0 |
| 1 | 1 | 0 | 45 |

FIG. 7(A)

| I | Q | I-Q | $\theta$ |
|---|---|---|---|
| 2 | 0 | 2 | 0 |
| 2 | 1 | 1 | 26 |
| 2 | 2 | 0 | 45 |

FIG. 7(B)

| I | Q | I-Q | $\theta$ |
|---|---|---|---|
| 3 | 0 | 3 | 0 |
| 3 | 1 | 2 | 18 |
| 3 | 2 | 1 | 34 |
| 3 | 3 | 0 | 45 |

FIG. 7(C)

| I | Q | I-Q | θ |
|---|---|-----|---|
| 4 | 0 | 4 | 0 |
| 4 | 1 | 3 | 14 |
| 4 | 2 | 2 | 27 |
| 4 | 3 | 1 | 37 |
| 4 | 4 | 0 | 45 |

FIG. 7(D)

| I | Q | I-Q | θ |
|---|---|-----|---|
| 5 | 0 | 5 | 0 |
| 5 | 1 | 4 | 11 |
| 5 | 2 | 3 | 22 |
| 5 | 3 | 2 | 31 |
| 5 | 4 | 1 | 39 |
| 5 | 5 | 0 | 45 |

FIG. 7(E)

| I | Q | I-Q | $\theta$ |
|---|---|---|---|
| 6 | 0 | 6 | 0 |
| 6 | 1 | 5 | 7 |
| 6 | 2 | 4 | 18 |
| 6 | 3 | 3 | 27 |
| 6 | 4 | 2 | 34 |
| 6 | 5 | 1 | 40 |
| 6 | 6 | 0 | 45 |

FIG. 7(F)

| I | Q | I-Q | $\theta$ |
|---|---|---|---|
| 7 | 0 | 7 | 0 |
| 7 | 1 | 6 | 8 |
| 7 | 2 | 5 | 16 |
| 7 | 3 | 4 | 23 |
| 7 | 4 | 3 | 30 |
| 7 | 5 | 2 | 36 |
| 7 | 6 | 1 | 41 |
| 7 | 7 | 0 | 45 |

FIG. 7(G)

METHOD OF CORDIC COMPUTING VECTOR ANGLE AND ELECTRONIC APPARATUS USING THE SAME

CROSS-REFERENCE TO RELATED APPLICATION

This application claims the priority benefit of Taiwan application serial no. 97149760, filed on Dec. 19, 2008. The entirety of the above-mentioned patent application is hereby incorporated by reference herein and made a part of specification.

BACKGROUND OF THE INVENTION

1. Field of Invention

The present invention generally relates to a signal processing method, and more particularly, to a method of computing a vector angle by using a coordinate rotation digital computer (CORDIC) and an electronic apparatus using the same.

2. Description of Related Art

Among various signal processing approaches, CORDIC is a very useful means. As a signal processing approach, CORDIC dates back 1959 when Volder firstly published the idea in his paper "*The CORDIC Trigonometric Computing Technique*" (IRE Transactions on Electronic Computing, EC-8, pp. 330-334). The major operations used in the CORDIC algorithm include addition and shifting. The CORDIC approach is applied in the aviation system field at the beginning, so that a vector rotation and an orientation operation can be done without performing complicate operations such as trigonometric function operation, multiplication operation, radical operation and operation of inverse trigonometric functions.

In recent years, along with the flourishing wireless communication technology, CORDIC has obtained broad application fields: WLAN (wireless local area network), personal WLAN, metropolitan WLAN, digital IC design, and the like. For example, the multi-input multi-output approach in the wireless transmission field is realized by using the CORDIC to perform matrix resolutions.

FIG. 1(A) is a diagram illustrating a conventional CORDIC coordinate rotation mode, where an initial vector $(X_0, Y_0)$ is rotated by an angle $\theta$ (where $\theta$ is ranged between −90 degree (−90°) and 90 degree (90°) so that an object vector $(X_1, Y_1)$ is obtained. There is the following simple relationship between the two vectors:

$$X_1 = X_0 \cdot \cos\theta - Y_0 \sin\theta = \cos\theta(X_0 - Y_0 \tan\theta) \quad (1)$$

$$Y_1 = Y_0 \cdot \cos\theta + X_0 \sin\theta = \cos\theta(Y_0 - X_0 \tan\theta) \quad (2)$$

Assuming the initial vector takes rotations of n times and then a new vector is obtained, and the rotated angle 6 of each rotation is just an angle corresponding to a tangent value equal to a multiple of 2 (for example, 45° has a tangent value of $2^0$; 26° has a tangent value of $2^{-1}$), the rotated angle δ of the 1-th time rotation can be expressed by:

$$\delta = \arctan(2^{-1}) \quad (3)$$

The corresponding cosine value can be obtained from the formula (3):

$$\cos\delta = 1/\sqrt{1+2^{-2i}} \quad (4)$$

The intermediate vector corresponding to the i-th time rotation can be expressed by:

$$X_{i+1} = 1/\sqrt{1+2^{-2i}} \cdot (X_i - d_i \cdot Y_i \cdot 2^{-i}) \quad (5)$$

$$Y_{i+1} = 1/\sqrt{1+2^{-2i}} \cdot (Y_i + d_i \cdot X_i \cdot 2^{-i}) \quad (6)$$

Referring to the relationship between the initial vector and the object vector, in the formulas (5) and (6), $d_i$ represents the shift unit of the i-th time. Obviously, the intermediate vector can be further simplified as:

$$X_{i+1} = (X_i - d_i \cdot Y_i \cdot 2^{-i}) \quad (7)$$

$$Y_{i+1} = (Y_i + d_i \cdot X_i \cdot 2^{-i}) \quad (8)$$

After the rotations of i times, the relative error between the intermediate vector and the object vector is $$z_{i+1} = (z_i - d_i \cdot \arctan(2^{-i})) \quad (9)$$

Therefore, after the rotations of n times, the initial vector would be coincident with the object vector, that is:

$$X_n = X1 = X0 \cdot \cos\theta - Y0 \cdot \sin\theta \quad (10)$$

$$Y_n = Y1 = Y0 \cdot \cos\theta + X0 \cdot \sin\theta \quad (11)$$

$$z_n = 0 \quad (12)$$

$$A_n = \Pi_n \sqrt{1+2^{-2i}} \quad (13)$$

where, $(X_n, Y_n)$ represents the intermediate vector produced from the initial vector after the rotations of n times; $z_n$ represents the relative error between the intermediate vector and the object vector after the rotations of n times; $A_n$ represents the CORDIC gain value after the rotations of n times.

It should be noted that when θ falls in the second quadrant or the third quadrant (between 90° and 270°), CORDIC needs to perform an rotation first, so that can be controlled to fall in the first quadrant or the fourth quadrant.

FIG. 1(B) is a diagram illustrating a conventional CORDIC coordinate vector mode. In an orthogonal coordinate system, a sampling signal of the initial vector $(X_0, Y_0)$ is rotated towards the I axis as the object, wherein the coordinates of Q axis thereof need to be minimized. Referring to the depiction of the above-mentioned CORDIC coordinate rotation mode, the relationship between the intermediate vector $(X_i, Y_i)$ corresponding to the i-th time rotation and the intermediate vector $(X_{i+1}, Y_{i+1})$ corresponding to the (i+1)-th time rotation can be expressed by:

$$X_{i+1} = (X_i - d_i \cdot Y_i \cdot 2^{-i}) \quad (14)$$

$$Y_{i+1} = (Y_i + d_i \cdot X_i \cdot 2^{-i}) \quad (15)$$

$$z_{i+1} = (z_i - d_i \cdot \arctan(2^{-i})) \quad (16)$$

wherein $d_i$ represents the shift unit of the i-th time and $z_{i+1}$ represents phase error between the intermediate vector and the I axis after the rotations of i times.

FIG. 2 is a diagram of a conventional pipelined CORDIC electronic apparatus. The electronic apparatus includes a plurality of CORDIC sub-modules 200 (respectively including a storage device for saving tangent values 204) and registers 201, 202, and 203. Each CORDIC sub-module 200 receives a set of $(x_i, y_i, z_i)$ of inputs and outputs a set of $(x_{i+1}, y_{i+1}, z_{i+1})$, wherein i ranges from 0 to n. The CORDIC sub-modules 200 are arranged with a pipelined structure so as to perform an iteration operation. The CORDIC sub-module 200 performs shifting and addition operation. The registers 201~203 respectively record the outputs of $(x_{i+1}, y_{i+1}, z_{i+1})$. Since each CORDIC sub-module 200 must contain a storage device for saving tangent values 204 for recording a plurality of tangent values.

FIG. 3 is an arc tangent table used in the conventional CORDIC. Referring to FIG. 2, in the complex coordinates, i represents the times of CORDIC iteration operations. For an initial complex coordinate R, the corresponding phase (the arc tangent of K), a radius and a CORDIC gain value can be respectively obtained according to a specific tangent value K.

FIG. 4 is a schematic graph showing a simulation result for the conventional CORDIC to compute larger angles, where the abscissa axis represents time and the ordinate axis represents the angle degree of the phase error. Under the CORDIC coordinate rotation mode, if the initial phase error is at 44 degree, it needs rotations of 10 times to make the corresponding relative phase error converged. Obviously, the converging speed is too slow and the estimated angle is not accurate, wherein the reason is that no matter a large angle or a small angle to be estimated, the conventional CORDIC needs to repeatedly perform an accumulation operation one after another from a large angle up, and each addend is produced by a power of 2.

The CORDIC algorithm can be referred from the following papers, for example, the paper of Wang, et al "*Critically Damped CORDIC Algorithm*" (Proceedings of the 37th Midwest Symposium on Circuits and Systems, Lafayette, La., pp. 236-239).

The CORDIC algorithm can be also referred from the paper of Takagi "*Studies on Hardware Algorithms for Arithmetic Operations with a Redundant Binary Representation*" (Department of Information Science, Faculty of Engineering, University of Kyoto).

The CORDIC algorithm can be further referred from the paper of Timmermann, et al "*Low Latency Time CORDIC Algorithms*" (IEEE Transactions on Computers, Vol. 41, pp. 1010-1015).

SUMMARY OF THE INVENTION

The present invention is directed to a method of computing a vector angle by using a CORDIC.

In an embodiment, the present invention provides a method of computing a vector angle by using a CORDIC. In the method, an initial coordinate, a base phase and an index are obtained. A shift unit is judged according to the initial coordinate and a phase error detection is performed on the initial coordinate so as to lock a phase error according to the shift unit. A loop filtering is performed, where a first transfer function is used to filter out the high-frequency component of the phase error. An update processing is performed to compute an intermediate coordinate. A rotation angle is provided to the index according to a small-area iteration look up table (LUT). A numerical controlled oscillating is performed to accumulate the rotation angle so as to obtain a rotated angle; performing a dynamic shifting processing of the small-area iteration LUT; and performing a second transfer function processing on the rotated angle to obtain a normalized rotated angle. When the difference between the normalized rotated angle and the base phase is greater than a predetermined value, the above-mentioned steps are repeated; otherwise, a phase compensation processing is performed and the intermediate coordinate and the normalized rotated angle are output.

In an embodiment, the present invention provides an electronic apparatus suitable for computing a vector angle by using a CORDIC. The electronic apparatus includes a register device, a phase error detector, a loop filter, a small-area iteration LUT module and a phase compensation circuit. The register device is for registering an initial coordinate, a base phase, an index and a shift unit, wherein the shift unit is obtained by judging according to the initial coordinate. The phase error detector is for performing a phase error detection on the initial coordinate and then locking a phase error according to the shift unit. The loop filter is coupled to the phase error detector for filtering out the high-frequency component of the phase error. The small-area iteration LUT module is coupled to the loop filter for obtaining a rotation angle by looking up an iteration LUT according to the index. The phase compensation circuit is coupled to the phase error detector and the iteration look up table module for receiving the rotation angle and outputting an intermediate vector and a normalized rotated angle.

In order to the make the aforementioned and other objects, features and advantages of the present invention comprehensible, a embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is an arc tangent table used in the conventional CORDIC.

FIG. 5 is a flowchart of the method of CORDIC computing angles of vector according to an embodiment of the present invention.

FIGS. 7(A)-7(G) are diagrams showing the small-area-iteration LUTs according to an embodiment of the present invention.

DESCRIPTION OF EMBODIMENTS

Figure 1A:
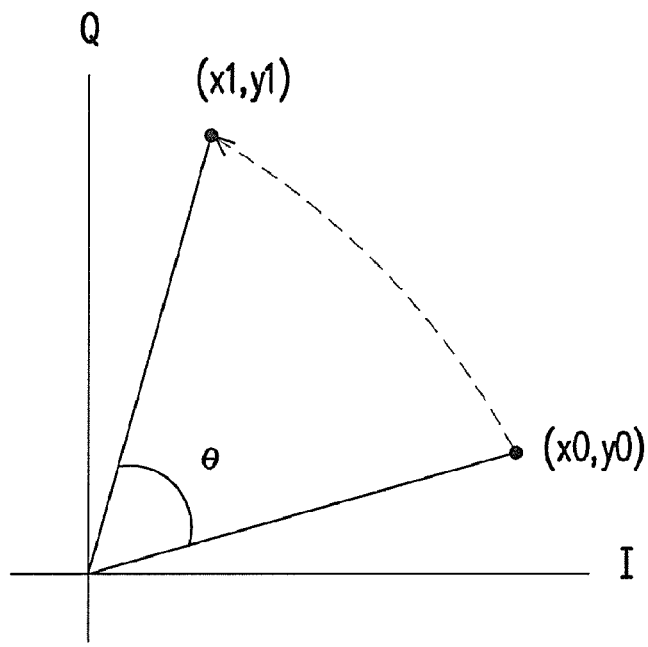
FIG. 1(A) is a diagram illustrating a conventional CORDIC coordinate rotation mode.
Figure 1B:
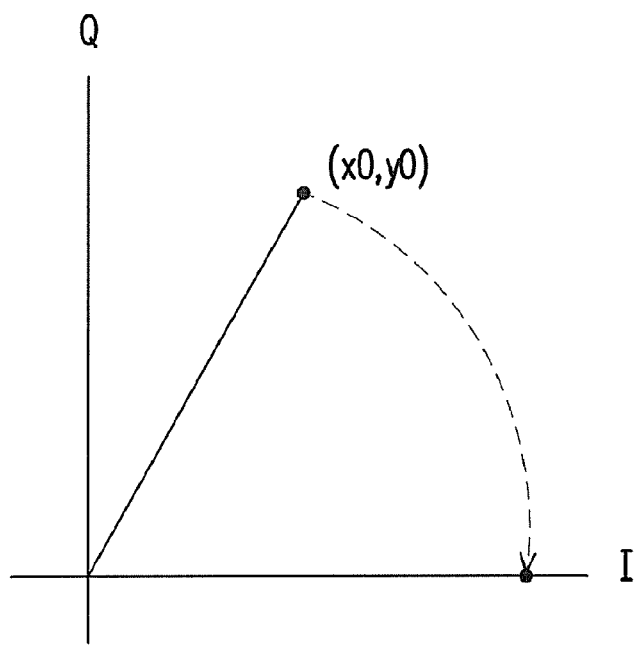
FIG. 1(B) is a diagram illustrating a conventional CORDIC coordinate vector mode.
Figure 2:
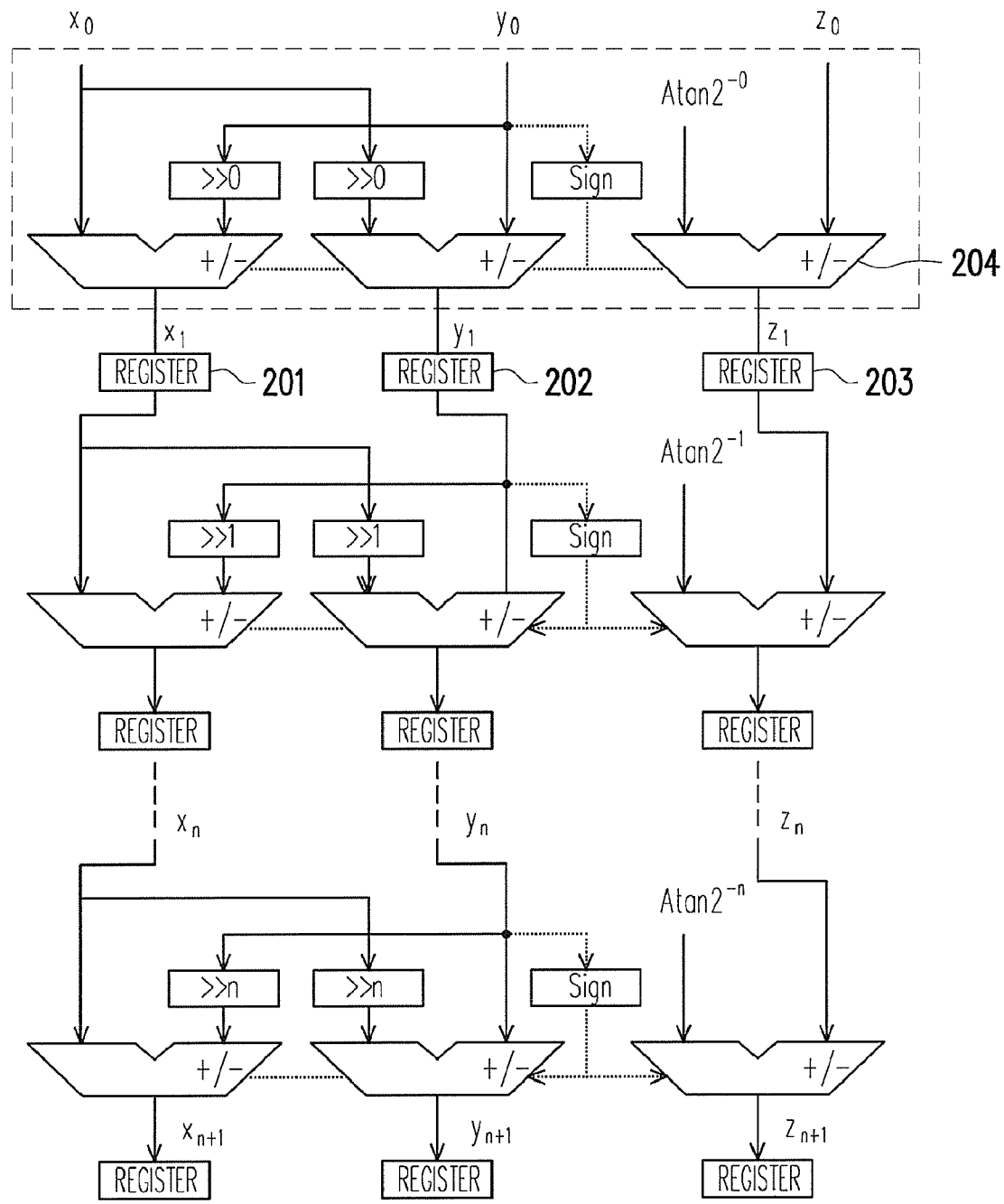
FIG. 2 is a diagram of a conventional pipelined CORDIC electronic apparatus.
Figure 4:
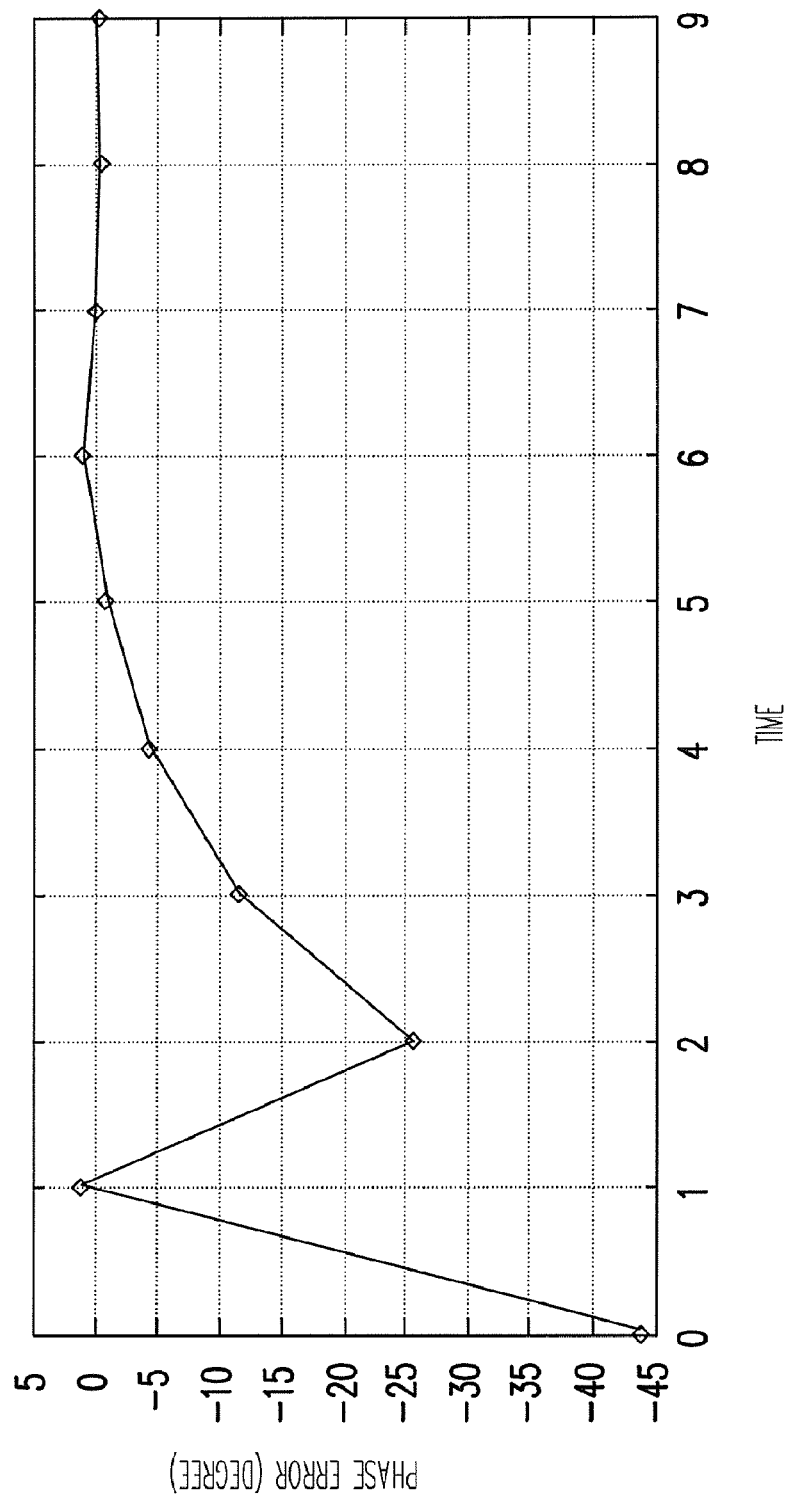
FIG. 4 is a schematic graph showing a simulation result for the conventional CORDIC to compute larger angles.

Reference will now be made in detail to the present preferred embodiments of the invention, examples of which are illustrated in the accompanying drawings. Wherever possible, the same reference numbers are used in the drawings and the description to refer to the same or like parts.

An embodiment of the present invention provides a method of computing a vector angle by using a CORDIC and an electronic apparatus using the method. The electronic apparatus mainly includes a phase error detector, a loop filter, a small-area iteration LUT module and a phase compensation circuit. By using a phase-locking loop in association with looking up the above-mentioned LUT, the present invention is able to get fast converging and higher accuracy for the computation.

An embodiment of the present invention provides a method of computing a vector angle by using a CORDIC. The method includes following steps. First, an initial coordinates $(X_0, Y_0)$, a base phase $\theta$ and an index are obtained. Next, a shift unit is judged according to the initial coordinates $(X_0, Y_0)$. Then, a phase error detection on the initial coordinates $(X_0, Y_0)$ is performed so as to lock a phase error z according to the shift unit. After that, a loop filtering is performed, wherein a transfer function is used to filter out the high-frequency component of the phase error "z". Further, an update processing including computing an intermediate coordinate (x, y) is performed. Further, a rotation angle is provided to the index according to a small-area iteration LUT. Further, a numerical controlled oscillating (NCO) is performed to accumulate the rotation angle so as to obtain a rotated angle. Further, a dynamic shifting processing of the small-area iteration LUT is performed. In the end, another transfer function processing is performed on the rotated angle to obtain a normalized rotated angle. When the difference between the normalized rotated angle and the base phase $\theta_0$ is greater than a predetermined value, the above-mentioned steps are repeated; otherwise, a phase compensation processing is performed and the intermediate coordinate (x, y) and the normalized rotated angle are output.

In the following, some embodiments associated with figures are described for the invented method of computing a vector angle by using a CORDIC and the invented electronic apparatus by using the method.

FIG. 5 is a flowchart of the method of CORDIC computing angles of vector according to an embodiment of the present invention. In a complex number coordinate system, there exits an initial vector $(X_0, Y_0)$ corresponding to a complex number $R_0$. The embodiment is able to compute the object vector $(X_t, Y_t)$ produced after rotating the initial coordinates $(X_0, Y_0)$ by an angle. Referring step S501 in FIG. 5, the initial coordinates $(X_0, Y_0)$ and the base phase $\theta_0$ are obtained.

In addition, the index is defined by one of $Q \times sign(I) - I \times sign(Q)$, $Q \times sign(I)$ or $I \times sign(Q)$, wherein Q represents the coordinates of second Cartesian axis of the initial coordinates $(X_0, Y_0)$ or the intermediate coordinate (x, y) and I represents the coordinates of first Cartesian axis of the initial coordinates $(X_0, Y_0)$ or the intermediate coordinate (x, y). The characteristic of the index would be depicted in details later in association with FIGS. 6(A)-6(E).

Referring to step S502, if the real number coordinate of the initial coordinates $(X_0, Y_0)$ is less than 0, the shift unit d=1; otherwise, the shift unit d=0. The shift unit d is mainly for controlling the direction of the CORDIC phase error oscillating. In the embodiment, the phase error oscillating exhibits a singular direction tendency. However in other embodiments, the sign of the shift unit d can be appropriately altered between positive sign and negative sign, which the present invention is not limited to.

Referring to step S503, a phase error detection on the initial coordinates is performed so as to lock a phase error z according to the shift unit d. The phase error detection is mainly for locking the phase error z, and an error function of phase-locking loop is used to keep locking the phase error z to be the minimum so that the error oscillates up-and-down about the number of zero.

The characteristic of the error function of phase-locking loop includes one of the indexes: $index(I, Q) = Q \times sign(I) - I \times sign(Q)$, $index(I, Q) = Q \times sign(I)$ or $index(I, Q) = I \times sign(Q)$, wherein Q represents the coordinates of real number axis of the initial coordinates $(X_0, Y_0)$ or the intermediate coordinate (x, y) and I represents the coordinates of imaginary number axis of the initial coordinates $(X_0, Y_0)$ or the intermediate coordinate (x, y).

The formula of the index $index(I, Q) = Q \times sign(I) - I \times sign(Q)$ is based on the fact that the index can be continuously changed between positive and negative within a quadrant. By using the principle of continuously changing the index between positive and negative, the signal is entered into the error function of phase-locking loop. After several oscillating operations, the compensation is repeatedly estimated meanwhile the error angle is reduced. In this way, the signal is locked on a declined line of 45 degree.

The indexes of $index(I, Q) = Q \times sign(I)$ or $index(I, Q) = I \times sign(Q)$ are similar to the above-mentioned index of $index(I, Q) = Q \times sign(I) - I \times sign(Q)$, but $index(I, Q) = Q \times sign(I)$ and $index(I, Q) = I \times sign(Q)$ are respectively locked on the real number axis and the real number axis of the complex number coordinate system.

If the base phase $\theta_0$ falls in the third quadrant or the fourth quadrant, prior to using the conventional CORDIC, the step of rotating an angle needs to be performed once more; but, the embodiment can save the step.

The phase error z includes a formula of $z = \theta_0 - d \times Table(index(I, Q))$, wherein d represents the shift unit and Table(index(I, Q)) represents the rotation angle corresponding to the index index(I, Q) according to the small-area iteration Look-up Table T.

Referring to step S504, a loop filtering is performed, wherein a transfer function is used to filter out the high-frequency component of the phase error z. The first transfer function includes $F(z) = C_1 + C_2/(1-z^{-1})$, wherein $C_1$ and $C_2$ are real numbers for determining a baseband and a converging speed. In the embodiment, a second-order loop filter is used. To achieve a fast operation speed of the hardware, a shift register instead of a multiplier is used in the first transfer function.

Referring to step S505, an update processing is performed, wherein common iteration algorithms are used for updating the initial coordinates $(X_0, Y_0)$ and the base phase $\theta_0$. The update processing includes following formulas:

$$x = X_0 - Y_0 \cdot index(I, Q) \cdot F(z) \quad (17)$$

$$y = Y_0 + X_0 \cdot index(I, Q) \cdot F(z) \quad (18)$$

$$(X_0, Y_0) = (x, y) \quad (19)$$

$$\theta_0 = z \quad (20)$$

Referring to step S506, a rotation angle is provided to the index according to the small-area iteration LUT. The method of looking up the small-area iteration LUT provided by the embodiment is depicted later referring to FIGS. 7(A)-7(G).

Referring to step S507, an NCO is performed to accumulate the rotation angle so as to obtain a rotated angle.

Referring to step S508, a dynamic shifting processing of the small-area iteration LUT is performed, wherein the rotation angle in the small-area iteration LUT is divided by the shift value and the rotation angle in the small-area iteration LUT is updated, so that the accuracy of the intermediate coordinate (x, y) can be advanced step by step along with every iteration operation. In the embodiment, the shift value is left-shifting three bits (equivalently to dividing the rotation angle by $2^3$). In other embodiments, it can be left-shifting four bits, which the present invention is not limited to.

Referring to step S509, a second transfer function processing is performed on the rotated angle to obtain a normalized rotated angle, wherein the second transfer function is $N(Z)= K_0 Z^{-1}/(1-Z^1)$, $K_0$ represents a gain value (i.e., the gain value subordinate to the CORDIC coordinate rotation mode) and Z represents the rotated angle.

Referring to step S510, if the difference between the normalized rotated angle and the base phase $\theta_0$ is greater than a predetermined value, the above-mentioned steps S501-S509 are repeated; otherwise, the flow enters step S511, where a phase compensation processing is performed and the intermediate coordinate (x, y) and the normalized rotated angle are output. In the CORDIC coordinate rotation mode, since the initial coordinates $(X_0, Y_0)$, the intermediate coordinate (x, y), the normalized rotated angle and the gain value are computed, the embodiment can use the iteration operations to successfully rotate the initial coordinates $(X_0, Y_0)$ by $\theta$ angle (i.e., normalized rotated angle) to obtain the object vector $(X_t, Y_t)$ (i.e., the intermediate coordinates (x, y)).

Figure 6A:
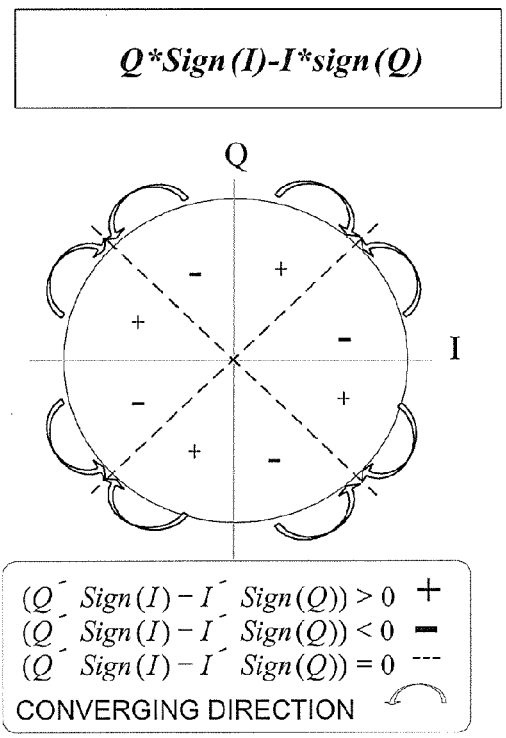
FIGS. 6(A)-6(E) are schematic graphs showing the characteristics of the indexes according to an embodiment of the present invention.
Figure 6B:
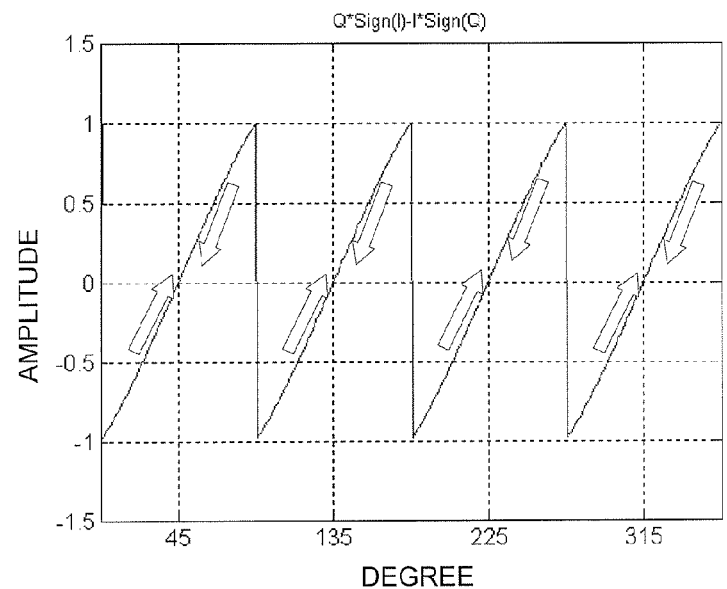

In the above-mentioned step S501, the initial coordinates $(X_0, Y_0)$ and the base phase $\theta_0$ are obtained, wherein the index is defined by one of Q×sign(I)−I×sign (Q), Q×sign(I) and I×sign(Q), wherein Q represents the coordinates of second Cartesian axis of the initial coordinates $(X_0, Y_0)$ or the intermediate coordinate (x, y) and I represents the coordinates of first Cartesian axis of the initial coordinates $(X_0, Y_0)$ or the intermediate coordinate (x, y) and I. The characteristic of the index can be depicted with FIGS. 6(A)-6(E). FIGS. 6(A)-6(E) are schematic graphs showing the characteristics of the indexes according to an embodiment of the present invention. FIGS. 6(A) and 6(B) shows the characteristic of Q×sign(I)−I×sign (Q), that is, the relationship between the rotation angle and the index Q×sign(I)−I×sign (Q) in a specific small-area iteration LUT, wherein Q×sign(I)−I×sign (Q) can be greater than, less than or equal to zero.

When the rotation angle is between 0° and 90° (within the first quadrant) while the index Q×sign(I)−I×sign (Q) is greater than zero, the corresponding amplitude of the index Q×sign(I)−I×sign (Q) converges upon zero, while the base phase $\theta_0$ converges upon 45°. Similarly, when the rotation angle falls in the second quadrant, the third quadrant and the fourth quadrant, the amplitude of the index and the Q×sign (I)−I×sign (Q) are converged.

Figure 6C:
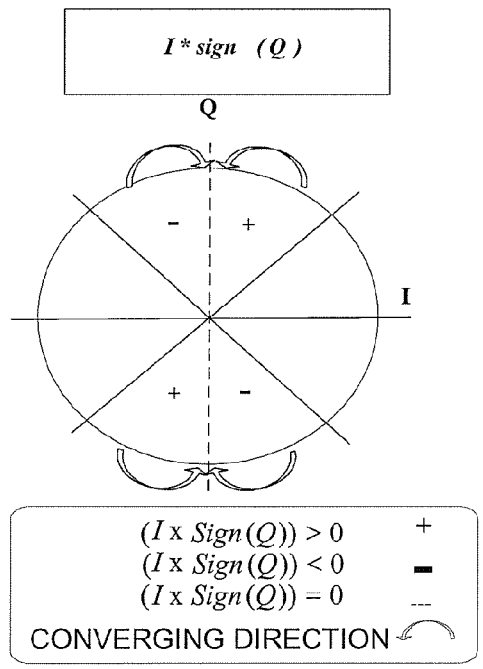
Figure 6D:
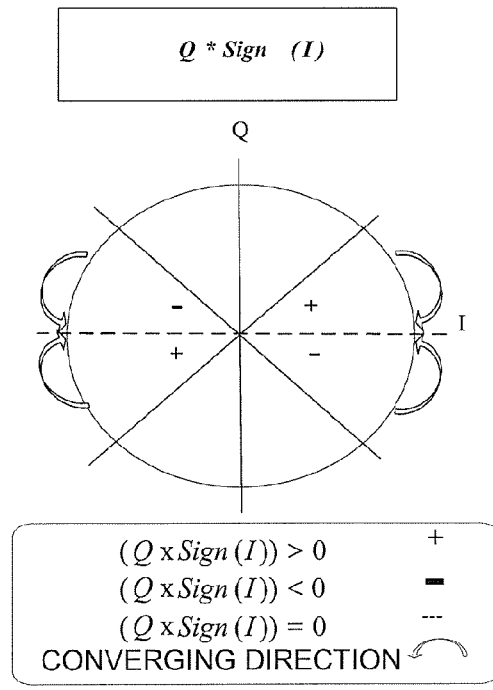
Figure 6E:
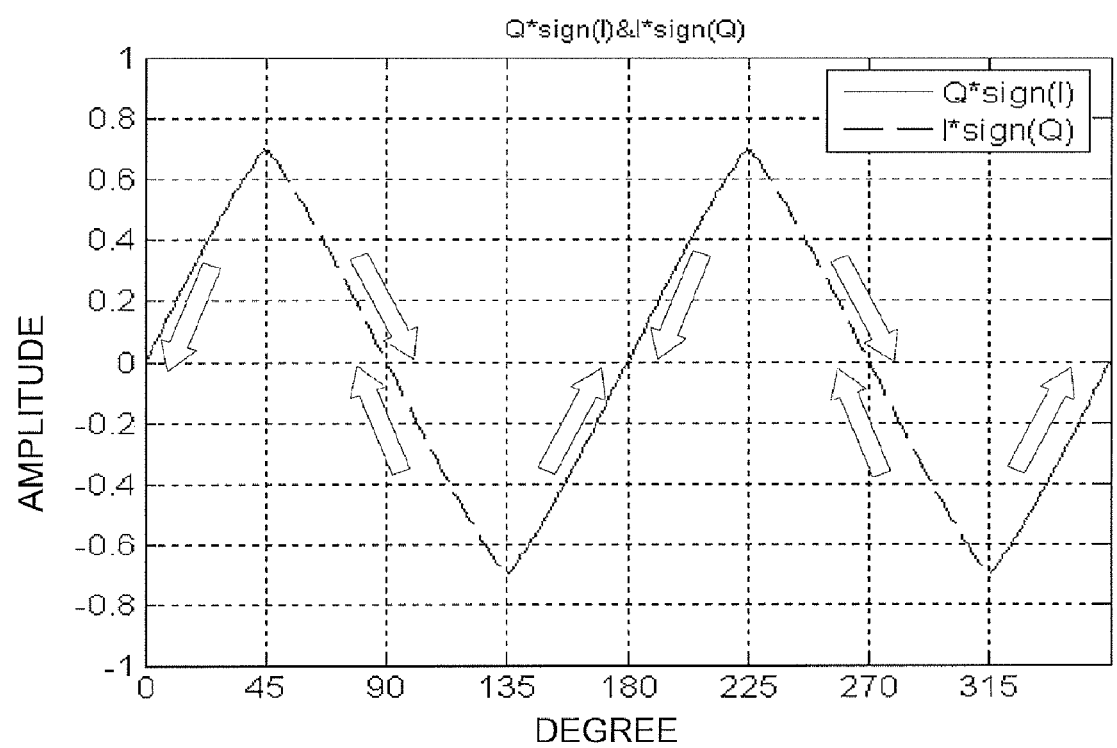

FIGS. 6(C) is a schematic graph showing the characteristic of the index I×sign(Q), FIG. 6(D) is for Q×sign(I) and FIG. 6(E) is for Q×sign(I) and I×sign(Q). The values of Q×sign(I) and I×sign(Q) can be greater than, less than or equal to zero. When the rotation angle is, for example, between 45° and 135°, the corresponding amplitude of the index I×sign(Q) converges upon zero, while the base phase $\theta_0$ converges upon 90°. When the rotation angle is, for example, between 135° and 225°, the corresponding amplitude of the index Q×sign(I) converges upon zero, while the base phase $\theta_0$ converges upon 180°.

FIGS. 7(A)-7(G) are diagrams showing the small-area-iteration LUTs according to an embodiment of the present invention. It can be seen that in terms of a set of index values (I, Q, I−Q), a corresponding rotation angle can be provided, so that, by looking up the table, the rotation angle corresponding to the indexes of index(I, Q)=Q×sign(I)−I×sign (Q), index (I, Q)=Q×sign(I) or index(I, Q)=I×sign(Q) can be obtained.

Figure 8A:
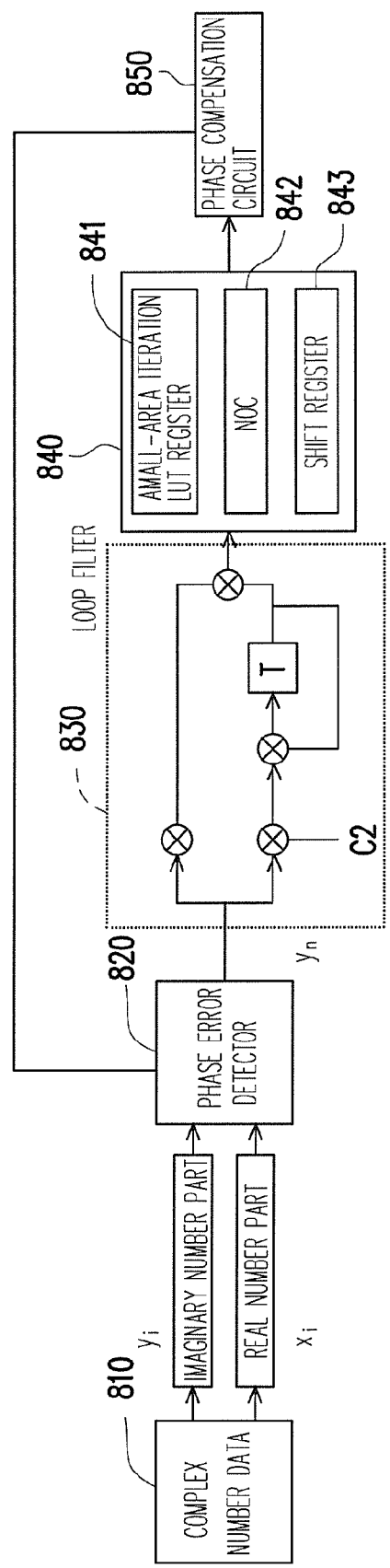
FIG. 8(A) is a diagram showing a CORDIC electronic apparatus according to an embodiment of the present invention.

FIG. 8(A) is diagrams partially showing a CORDIC electronic apparatus 800 according to an embodiment of the present invention. Referring to FIG. 8(A), the electronic apparatus of the embodiment includes a register for initial vectors 810, a phase error detector 820, a loop filter 830, a small-area iteration LUT module 840 and a phase compensation circuit 850.

The register for initial vectors 810 is coupled to the phase error detector 820 for recording a complex data $(x_i+j \times y_i)$ so as to obtain the initial vector $(x_i, y_i)$.

The phase error detector 820 is coupled to the loop filter 830 for locking a phase error, wherein the detail of computing the can refer to step S504.

Figure 8C:
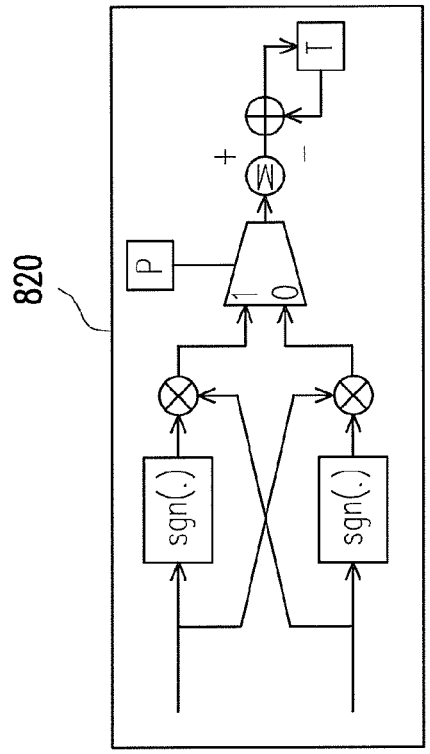
FIGS. 8(B) and 8(C) are diagrams of the logic circuits of the phase error detector 820 in FIG. 8(A).
Figure 8B:
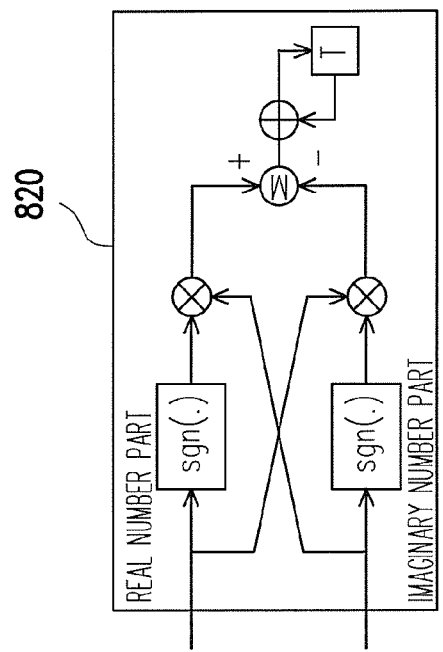

FIGS. 8(B) and 8(C) are diagrams of the logic circuits of the phase error detector 820 in FIG. 8(A). Assuming Q represents the real number part of the initial vector $(x_i, y_i)$, I represents the imaginary number part of the initial vector $(x_i, y_i)$ and T represents a delay, FIG. 8(B) shows a real logic circuit of the phase error detector 820, wherein the characteristic of the circuit is I×sign(Q)−Q×sign (I) or Q×sign(I)−I× sign (Q). FIG. 8(C) shows another real logic circuit of the phase error detector 820, wherein the characteristic of the circuit is Q×sign(I) or I×sign(Q), Q by means of a multiplexer.

The loop filter 830 is coupled to the small-area iteration LUT module 840 for filtering the high-frequency component of the phase error. The loop filter 830 includes the first transfer function $F(z)=C_1+C_2/(1-z^{-1})$, wherein $C_1$ and $C_2$ are real numbers for determining a baseband and a converging speed, and z represents the phase error.

The small-area iteration LUT module 840 further includes a small-area iteration LUT register 841, an numerical controlled oscillator (NCO) 842 and a shift register 843. The small-area iteration LUT register 841 recodes the rotation angle according to the index. The index includes Q×sign(I)− I×sign (Q), Q×sign(I) or I×sign(Q), wherein Q represents the real number part of the initial vector $(x_i, y_i)$ and I represents the imaginary number part of the initial vector $(x_i, y_i)$.

The NCO 842 is for accumulating the rotation angle. The NCO includes a phase accumulator for accumulating the rotation angle so as to obtain the rotated angle. The phase accumulator includes a second transfer function of $N(Z)= K_0 Z^{-1}/(1-Z^{-1})$, wherein $K_0$ represents a gain value and Z represents the rotated angle. By means of the transfer processing of the second transfer function, a normalized rotated angle is obtained.

The shift register 843 is for dividing the rotation angle by a shift value and writing the result into small-area iteration LUT register 841.

The phase compensation circuit 850 is coupled to the phase error detector 820. If the difference between the normalized rotated angle and the base phase is greater than the predetermined value, the initial vector $(x_i, y_i)$ and the base phase are compensated; otherwise, the phase compensation circuit 850 outputs the intermediate vector and the normalized rotated angle.

Figure 9B:
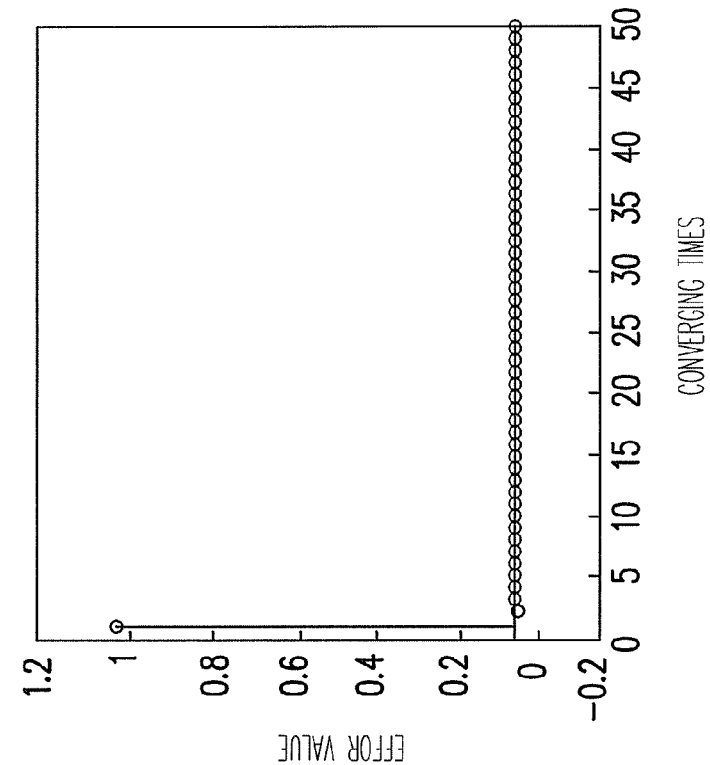
FIGS. 9(A) and 9(B) are two graphs showing the convergence courses at larger angles respectively corresponding to the conventional CORDIC and the CORDIC of the present invention.
Figure 9A:
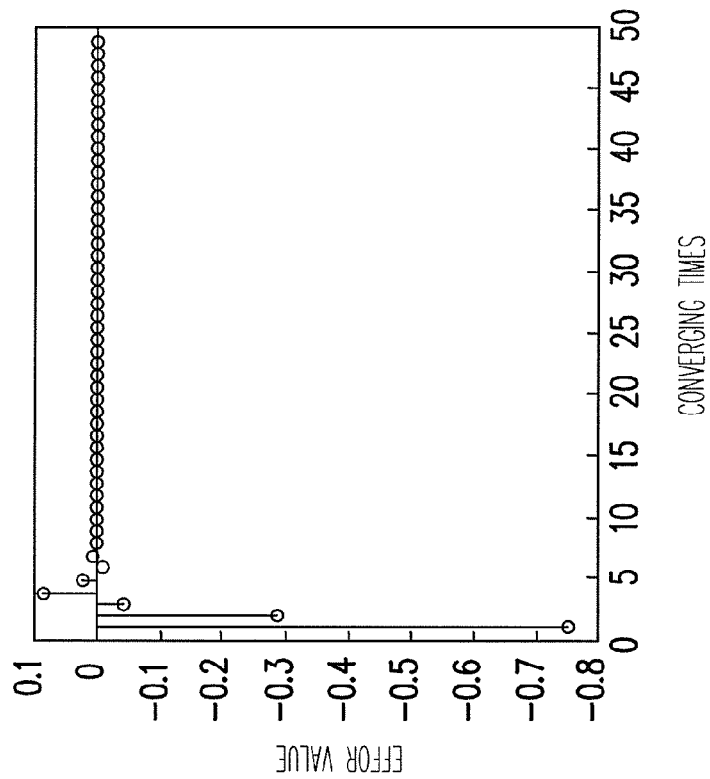

FIGS. 9(A) is a graph showing the convergence courses at larger angles (88°) corresponding to the conventional CORDIC. Referring to FIG. 9(A), the abscissa axis represents converging times and the ordinate axis represents error value. It can be seen that the conventional CORDIC needs rotations of over 10 times to make the corresponding relative phase error converged and the error value is reduced to zero.

FIGS. 9(B) is a graph showing the convergence courses at larger angles (88°) corresponding to the CORDIC provided by an embodiment of the present invention. Referring to FIG. 9(B), the abscissa axis represents converging times and the ordinate axis represents error value. It can be seen that the invented CORDIC needs only a couple of rotations to make the corresponding relative phase error converged and the error value is reduced to zero.

Figure 10B:
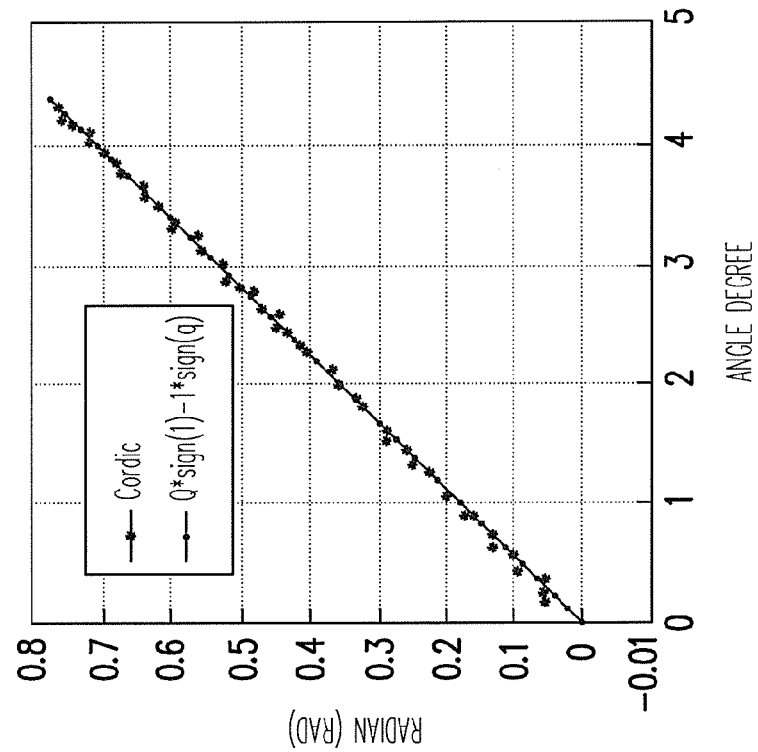
FIGS. 10(A) and 10(B) are two graphs showing the convergence courses at smaller angles respectively corresponding to the conventional CORDIC and the CORDIC of the present invention.
Figure 10A:
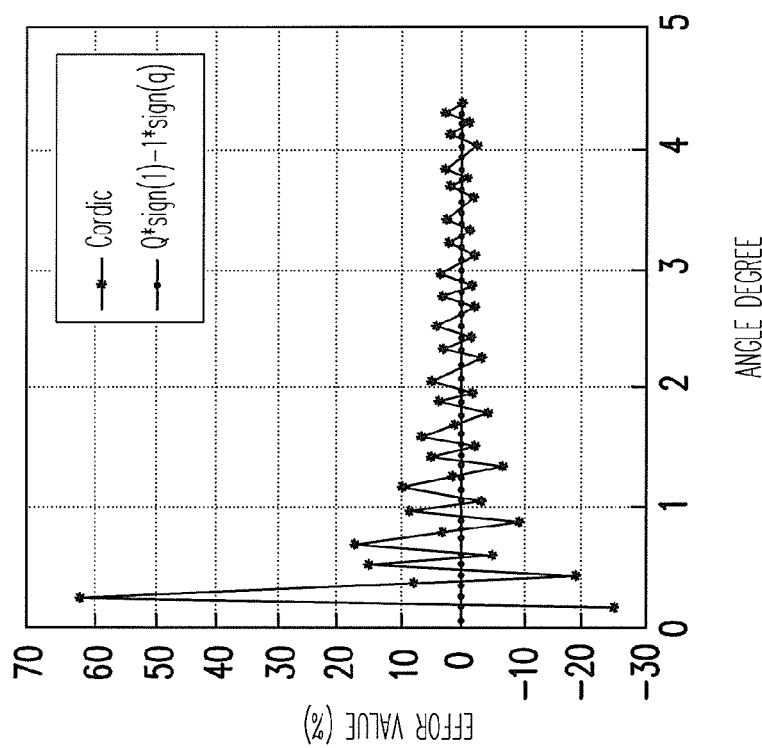

FIGS. 10(A) and 10(B) are two graphs showing the convergence courses at smaller angles respectively corresponding to the conventional CORDIC and the CORDIC of the present invention, wherein the converging times is set as 10 and the index is set as Q×sign(I)−I×sign (Q). In FIG. 10(A), the abscissa axis represents angle (for comparing the converging from 0 degree to 5 degree) and the ordinate axis represents the percent of error value. It can be seen that the percent of error value of the conventional CORDIC for small angles exhibits oscillation, while the percent of error value of the embodiment can keep at zero.

In FIG. 10(B), the abscissa axis represents angle (for comparing the converging from 0 degree to 5 degree and the ordinate axis represents radian (rad). It can be seen that with the conventional CORDIC under the rotation mode, the object phase can not be reached by rotations so that the vector oscillates up-and-down about the line of 45°, while the embodiment can better used to estimate the rotated angle and the object phase is almost reached.

In summary, the present invention includes at least the phase error detector, the loop filter and the small-area iteration LUT. The phase error can be locked by using the error function in the phase error detector, and even the phase error can be locked to the minimum so that the error oscillates up-and-down about the zero level. The first transfer function in the loop filter can determine the baseband and the converging speed. Moreover, if the shifting technique is used, the operation of the first transfer function is speeded up.

In addition, the small-area iteration LUT can simplify the storage device for saving tangent values.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of computing a vector angle by using a coordinate rotation digital computer (CORDIC), comprising:
    obtaining an initial coordinate, a base phase and an index;
    judging a shift unit according to the initial coordinate;
    performing a phase error detection on the initial coordinate so as to lock a phase error according to the shift unit;
    performing a loop filtering, using a loop filter circuit, wherein a first transfer function is used to filter out the high-frequency component of the phase error;
    performing an update processing and computing an intermediate coordinate;
    providing a rotation angle to the index according to an iteration look up table;
    performing a numerical controlled oscillating to accumulate the rotation angle so as to obtain a rotated angle;
    performing a dynamic shifting processing of the iteration look up table;
    performing a second transfer function processing on the rotated angle to obtain a normalized rotated angle, wherein when the difference between the normalized rotated angle and the base phase is greater than a predetermined value, the above-mentioned steps are repeated; otherwise, a phase compensation processing is performed by a phase compensation circuit and the intermediate coordinate and the normalized rotated angle are output; and wherein the step of dynamic shifting processing comprises dividing the rotation angle in the iteration look up table by a shift value and updating the rotation angle in the iteration look up table.

2. The method of computing a vector angle by using a CORDIC as claimed in claim 1, wherein the index comprises one of the formulas of index(I, Q)=Q×sign(I)−I×sign (Q), index(I, Q)=Q ×sign(I) and index(I, Q)=I×sign(Q), index(I, Q) represents the index, Q represents the coordinates of second Cartesian axis of the initial coordinate or the intermediate coordinate and I represents the coordinates of first Cartesian axis of the initial coordinate or the intermediate coordinate.

3. The method of computing a vector angle by using a CORDIC as claimed in claim 2, wherein the step of performing a phase error detection comprises performing a processing of error function of phase-locking loop and the characteristic of the error function of phase-locking loop is the index.

4. The method of computing a vector angle by using a CORDIC as claimed in claim 3, wherein the first transfer function comprises $F(z)=C_1+C_2/(1-z^{-1})$, and $C_1$ and $C_2$ are real numbers for determining a baseband and a converging speed.

5. The method of computing a vector angle by using a CORDIC as claimed in claim 4, wherein the phase error comprises $z=\theta_0-d\times Table(index(I, Q))$,
    wherein z represents the shift unit, $\theta_0$ represents the base phase, d represents the shift unit and Table(index(I, Q)) represents the rotation angle corresponding to the index index(I, Q) according to the iteration look up table T.

6. The method of computing a vector angle by using a CORDIC as claimed in claim 5, wherein the update processing is for updating the initial coordinates $(X_0, Y_0)$ and the base phase $\theta_0$ and is performed by using a set of formulas of $x=X_0-Y_0\times index (I, Q)\times F(z)$, $y\times Y_0-X_0\times index (I, Q)\times F(z)$, $(X_0, Y_0)=(x, y)$ and $\theta_0=z$.

7. The method of computing a vector angle by using a CORDIC as claimed in claim 6, wherein the second transfer function is $N(Z)=K_0Z^{-1}(1-Z^{-1})$, $K_0$ represents a gain value and Z represents the rotated angle.

8. The method of computing a vector angle by using a CORDIC as claimed in claim 1, wherein the iteration look up table is a small-area iteration look up table.

9. An electronic apparatus, for computing a vector angle by using a coordinate rotation digital computer (CORDIC); the electronic apparatus comprising:
    a register device, for registering an initial coordinate, a base phase, an index and a shift unit, wherein the shift unit is obtained by judgement according to the initial coordinate;
    a phase error detector; for performing a phase error detection on the initial coordinate and then locking a phase error according to the shift unit;
    a loop filter circuit, coupled to the phase error detector for filtering out the high-frequency component of the phase error;
    an iteration look up table module, coupled to the loop filter for obtaining a rotation angle by looking up an iteration look up table according to the index;
    a phase compensation circuit, coupled to the phase error detector and the iteration look up table module for receiving the rotation angle and outputting an intermediate vector and a normalized rotated angle; and wherein the iteration look up table module comprises: a register of iteration look up table, coupled to the loop filter circuit for recording a rotation angle according to the index; a numerical controlled oscillator, coupled to the register of iteration look up table for accumulating the rotation angle; and a shift register, for dynamically updating the rotation angle of the register of iteration look up table.

10. The electronic apparatus as claimed in claim 9, wherein the numerical controlled oscillator comprises a phase accumulator for accumulating the rotation angle to obtain a rotated angle.

11. The electronic apparatus as claimed in claim 10, wherein the phase accumulator comprises a second transfer function of $N(Z)=K_0 Z^{-1}(1-Z^{-1})$, $K_0$ represents a gain value and Z represents the rotated angle.

12. The electronic apparatus as claimed in claim 9, wherein the shift register is for dividing the rotation angle by a shift value and writing the result into the register of iteration look up table.

13. The electronic apparatus as claimed in claim 9, wherein the index comprises one of $Q\times sign(I)-I\times sign(Q)$, $Q\times sign(I)$ and $I\times sign(Q)$, Q represents the coordinates of second Cartesian axis of the initial coordinate or the intermediate coordinate and I represents the coordinates of first Cartesian axis of the initial coordinate or the intermediate coordinate.

14. The electronic apparatus as claimed in claim 9, wherein the loop filter filters out the high-frequency component of the phase error according to a first transfer function, wherein the first transfer function comprises $F(z)=C_1+C_2/(1-z^{-1})$, $C_1$ and $C_2$ are real numbers for determining a baseband and a converging speed, and z represents the phase error.

15. The electronic apparatus as claimed in claim 9, wherein the iteration look up table in the iteration look up table module is a small-area iteration look up table.

* * * * *